(12) United States Patent
Downs et al.

(10) Patent No.: US 7,506,883 B2
(45) Date of Patent: Mar. 24, 2009

(54) BALL JOINT ASSEMBLY

(75) Inventors: James Downs, South Lyon, MI (US); Herb Adams, Waterford, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 228 days.

(21) Appl. No.: 11/522,249

(22) Filed: Sep. 15, 2006

(65) Prior Publication Data

US 2007/0007740 A1  Jan. 11, 2007

Related U.S. Application Data

(63) Continuation-in-part of application No. 11/029,960, filed on Jan. 5, 2005, now Pat. No. 7,234,715.

(51) Int. Cl.
*B60G 3/04* (2006.01)
(52) U.S. Cl. .......................... 280/124.134; 280/93.511
(58) Field of Classification Search .......... 280/124.134, 280/124.126, 124.128, 124.135, 124.136, 280/93.511, 93.51, 93.502
See application file for complete search history.

(56) References Cited

U.S. PATENT DOCUMENTS

| | | | |
|---|---|---|---|
| 2,173,973 A | * | 9/1939 | Leighton ............. 280/124.136 |
| 4,722,540 A | | 2/1988 | Kozyra et al. |
| 4,916,788 A | | 4/1990 | Mitoya |
| 5,707,073 A | | 1/1998 | Stuker et al. |
| 5,954,353 A | | 9/1999 | Kincaid et al. |
| 6,276,702 B1 | | 8/2001 | Turck et al. |
| 6,481,731 B2 | | 11/2002 | McHale |
| 6,508,481 B2 | | 1/2003 | Seyuin et al. |

FOREIGN PATENT DOCUMENTS

DE  4224484  * 1/1994 .......... 280/124.134

OTHER PUBLICATIONS

Kyron Axle Assembly System brochure dated May 2005.

* cited by examiner

*Primary Examiner*—Eric Culbreth
(74) *Attorney, Agent, or Firm*—Harness, Dickey & Pierce, P.L.C.

(57) ABSTRACT

A wheel suspension assembly for a vehicle is operable to travel across a ground surface. The wheel suspension assembly includes a first suspension member, a second suspension member, a wheel rotatably coupled to the first suspension member and a ball stud interconnecting the first and second suspension members. The ball stud includes a ball and a tapered shaft. The tapered shaft extends along a longitudinal axis. One of the first and second suspension members includes a ball socket in receipt of the ball. The other of the first and second suspension members includes a tapered bore in the receipt of the tapered shaft. The longitudinal axis of the tapered shaft is oriented substantially parallel to the ground surface.

22 Claims, 9 Drawing Sheets

US 7,506,883 B2

BALL JOINT ASSEMBLY

CROSS-REFERENCE TO RELATED APPLICATIONS

This application is a continuation-in-part of U.S. patent application Ser. No. 11/029,960 filed on Jan. 5, 2005, now U.S. Pat. No. 7,234,715. The disclosure of the above application is incorporated herein by reference.

BACKGROUND AND SUMMARY OF THE INVENTION

The present invention generally relates to a wheel suspension assembly for a vehicle and, more particularly, to a wheel suspension assembly having a horizontally aligned ball joint assembly.

A wheel suspension assembly for a vehicle typically includes a knuckle or a spindle that rotatably supports one of the front and/or rear wheels of the vehicle. A tie rod, control arm or other suspension member may be rotatably coupled to the knuckle with a ball stud. The ball stud has a shank portion with a tapered external surface at one end and a substantially spherically shaped ball at the other end. Typically, the ball stud is vertically oriented relative to the ground. Because the stud is retained using a taper fit, it is difficult to accurately locate the center of the ball at a desired distance from the horizontally extending axis about which the wheels rotate.

The positioning problem exists because the taper is typically a small angle. As such, even a small dimensional change in stud diameter or tapered hole size results in a relatively large variation in the position of the center of the ball stud relative to the wheel axis of rotation. Some independent rear suspensions require very accurately positioned ball joints to maintain the desired vehicle handling characteristics.

One solution to the present issue would be to reduce the tolerances on the tapered surfaces of the knuckle and the ball stud to position the ball within a desired tolerance. However, the cost of manufacturing such assemblies may be prohibitive. Accordingly, it is desirable to manufacture a wheel suspension assembly having an accurately positioned ball in an economically feasible manner.

The present invention relates to a wheel suspension assembly for a vehicle operable to travel across a ground surface. The wheel suspension assembly includes a first suspension member, a second suspension member, a wheel rotatably coupled to the first suspension member and a ball stud interconnecting the first and second suspension members. The ball stud includes a ball and a tapered shaft. The tapered shaft extends along a longitudinal axis. One of the first and second suspension members includes a ball socket in receipt of the ball. The other of the first and second suspension members includes a tapered bore in the receipt of the tapered shaft. The longitudinal axis of the tapered shaft is oriented substantially parallel to the ground surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
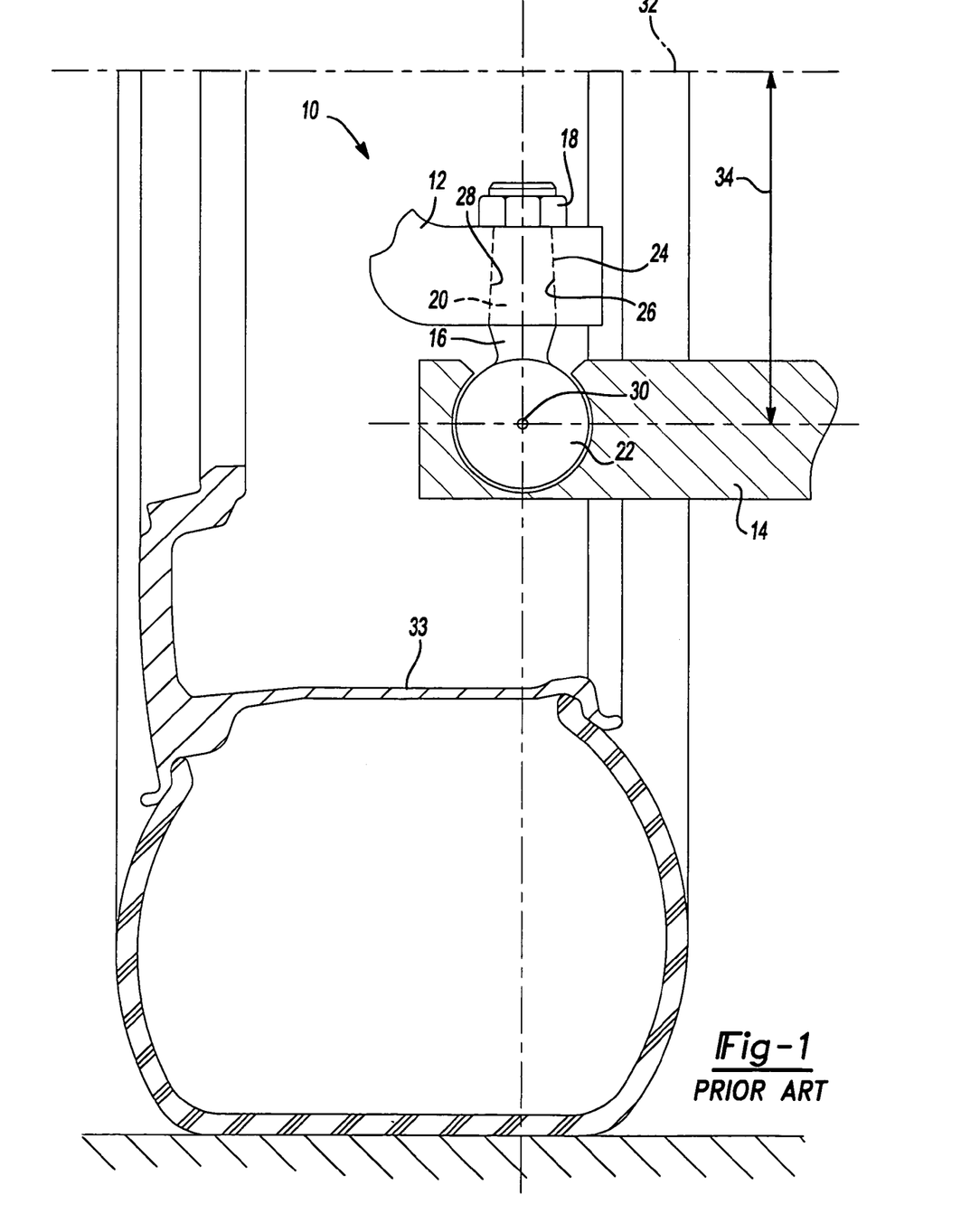
FIG. 1 is a fragmentary side view of a prior art wheel suspension assembly having a vertically oriented ball stud.

FIG. 1 depicts a portion of a prior art wheel suspension assembly 10 including a knuckle 12 and a control arm 14. Knuckle 12 is rotatably coupled to control arm 14 with a ball stud 16 and a nut 18. Ball stud 16 includes a tapered shank 20 and a ball 22. Tapered shank 20 includes an external surface 24 engaged with a surface 26 of a tapered aperture 28 formed in knuckle 12. Due to the relatively small angle of the taper, small dimensional variations in the size of tapered shank 20 and/or the size of tapered aperture 28 result in a multiplied variation in the position of a center 30 of ball 22 relative to a centerline 32 of a wheel 33. Based on a standard taper of 4.8 degrees, a dimension 34 varies at a multiplied rate of 6 to 1. For example, a change in the size of tapered shank 20 of 0.010 inches results in a 0.060 inch variance in dimension 34. As described above, a positional variance of this magnitude is unacceptable in certain suspension applications.

Figure 2:
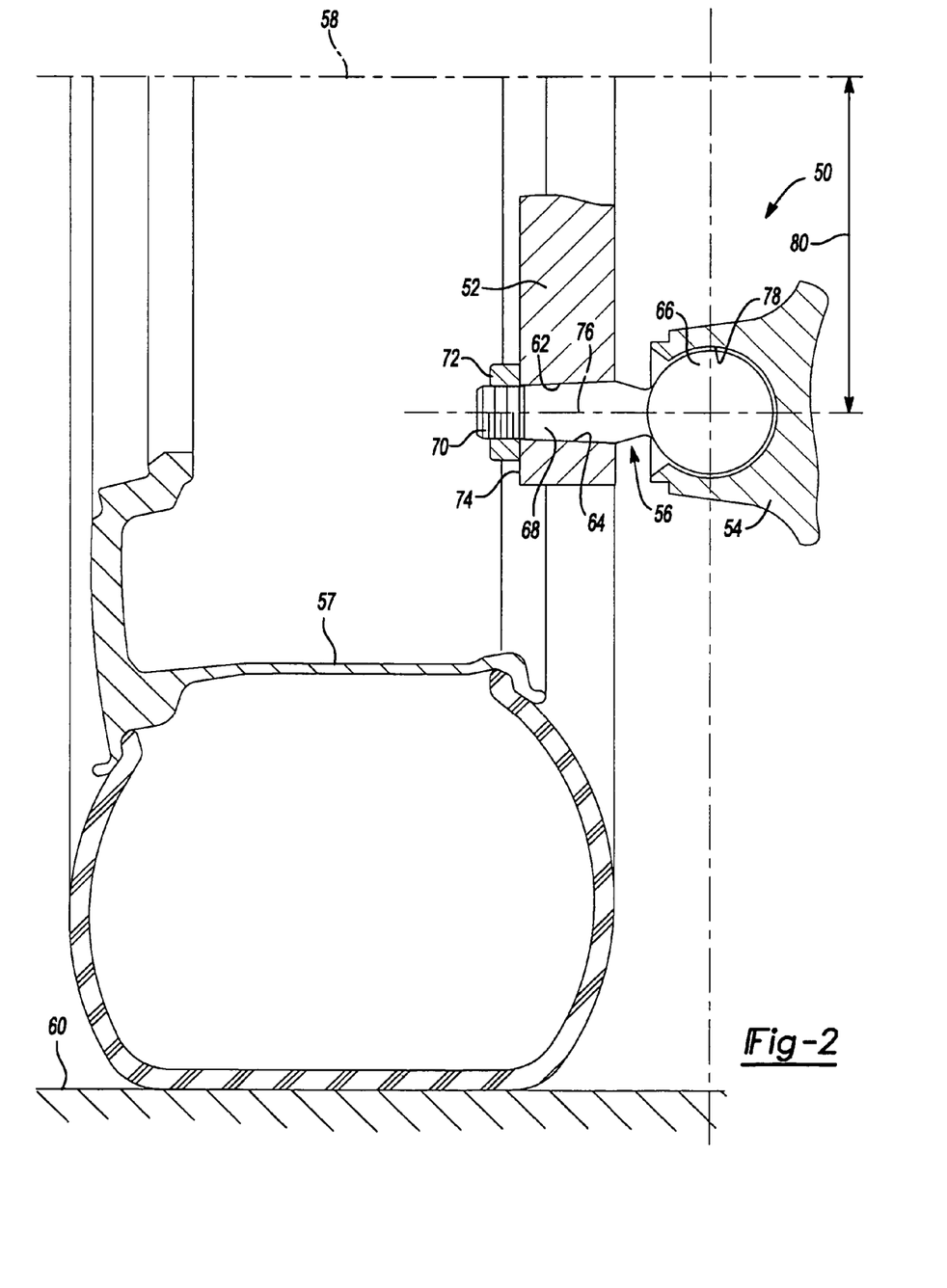
FIG. 2 is a fragmentary side view of a wheel suspension assembly constructed according to the principles of the present invention.

FIG. 2 depicts a wheel suspension assembly 50 constructed in accordance with the teachings of the present invention. Wheel suspension assembly 50 includes a knuckle 52 and a control arm 54 rotatably interconnected by a ball stud 56. Knuckle 52 is operable to rotatably support a wheel 57 for rotation about an axis 58. Axis 58 extends substantially parallel to a ground surface 60 over which a vehicle equipped with wheel suspension assembly 50 may travel. Knuckle 52 includes a tapered aperture 62 having a tapered wall surface 64.

Ball stud 56 includes a substantially spherical ball 66 integrally formed with a tapered shank portion 68 and a threaded portion 70. Threaded portion 70 is formed at an end opposite ball 66. A nut 72 is in threaded engagement with threaded portion 70. Nut 72 reacts against a face 74 of knuckle 52 to draw tapered shank portion 68 into engagement with tapered wall surface 64 of tapered aperture 62. Ball stud 56 includes a longitudinal axis 76 about which tapered shank portion 68 is formed.

Control arm 54 includes a socket 78 in receipt of ball 66. Socket 78 is sized and shaped to retain ball 66 within socket 78 while allowing control arm 54 to rotate relative to knuckle 52. Axis 76 extends substantially parallel to axis 58 and ground surface 60. In this manner, geometrical variations in the size of tapered shank portion 68 and/or tapered aperture 62 do not vary a distance 80 measured from the wheel rotation axis 58 and the center of ball 66.

During the manufacture of knuckle 52, a tool (not shown) is positioned distance 80 from axis 58 and translated along axis 76 to form tapered aperture 62. Accordingly, the centerline of aperture 62 is properly positioned distance 80 from axis 58. Therefore, variations in the size of aperture 62 or the size of tapered shank portion 68 will not vary the distance between the center of ball 66 and axis 58.

Figure 3:
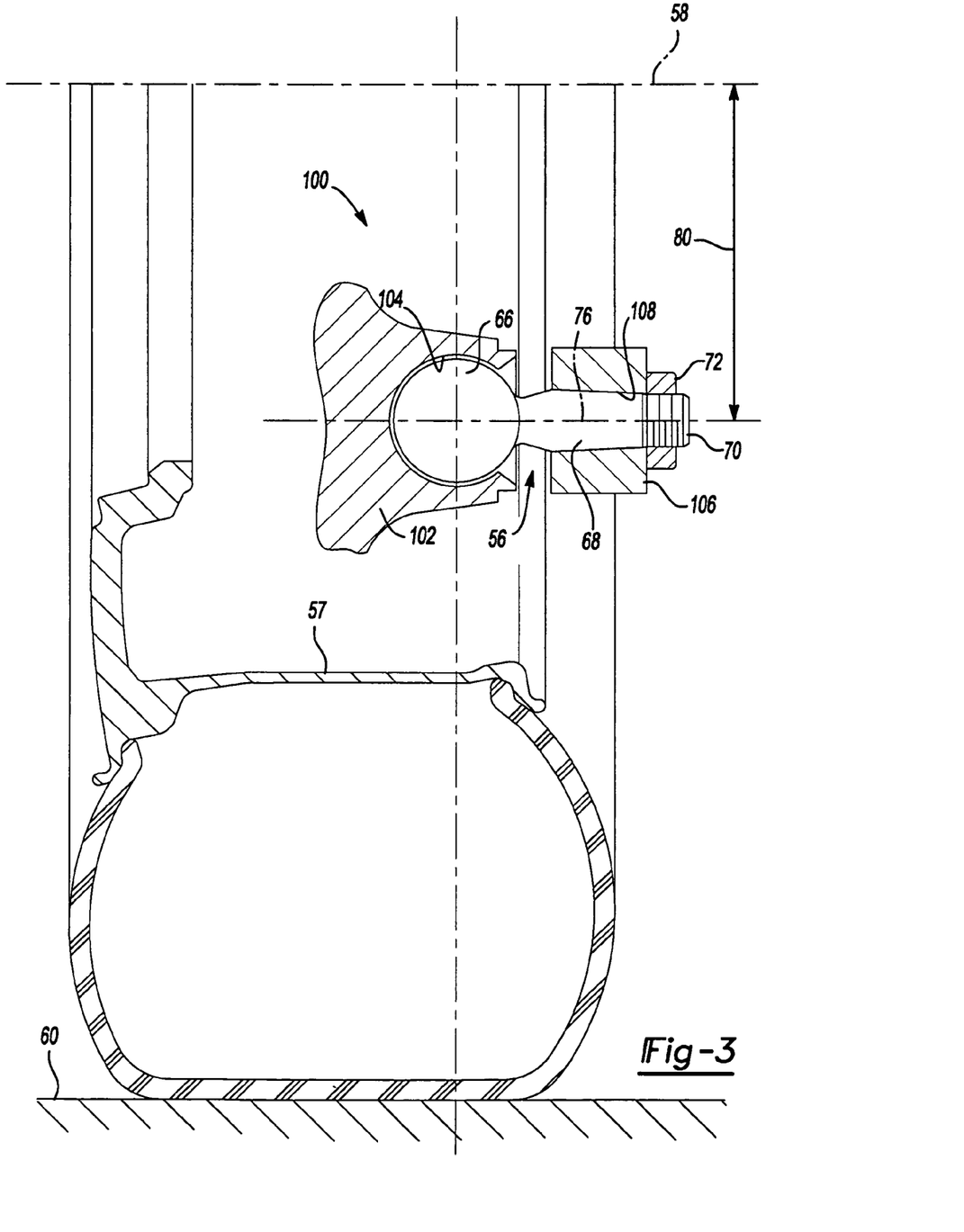
FIG. 3 is a fragmentary side view depicting an alternate embodiment wheel suspension assembly.

FIG. 3 depicts an alternate embodiment wheel suspension assembly 100. Wheel suspension assembly 100 is substantially similar to wheel suspension assembly 50 except that a knuckle 102 includes a substantially spherical socket 104 and a control arm 106 includes a tapered aperture 108. Ball stud 56 rotatably interconnects knuckle 102 and control arm 106. Based on the horizontally aligned axis 76 of ball stud 56, wheel suspension assembly 100 provides substantially similar advantages over the prior art as wheel suspension assembly 50. Accordingly, like elements will retain their previously introduced reference numerals and wheel suspension assembly 100 will not be described in further detail.

FIGS. 4-7 depict an alternate embodiment rear wheel suspension assembly 200. Rear wheel suspension assembly 200 is substantially similar to wheel suspension assembly 100. Accordingly, like elements will retain their previously introduced reference numerals. Furthermore, rear wheel suspension assembly 200 functions substantially similarly to wheel suspension assembly 100 in that ball stud 56 rotatably interconnects a knuckle 202 and a control arm 204. Ball stud 56 is horizontally aligned substantially parallel to the ground 60. In the embodiment shown in FIGS. 4-7, wheel 57 is not steerable but is rotatably coupled to rear wheel suspension assembly 200. Rear wheel suspension assembly 200 is part of an independent-type suspension not shown in complete detail.

Knuckle 202 includes a body portion 206, an upper arm 208, a lower arm 210, a socket 212 and a dust shield 214. Each of the portions numbered 206 through 214 are integrally formed with one another. It is contemplated that knuckle 202 may be formed by casting or forging materials such as magnesium, aluminum, cast iron or the like.

Knuckle 202 is configured to accept a spindle (not shown) for rotatably supporting a hub (not shown) and wheel 57 for rotation about axis 58. The spindle may be mounted to body portion 206. Body portion 206 includes an aperture 216 extending therethrough. A stub shaft (not shown) may be drivingly coupled to a power source and may extend through aperture 216 to allow wheel 57 to be driven. One skilled in the art will appreciate that knuckle 202 may also be used in conjunction with non-driving axles without departing from the scope of the present invention.

Upper arm 208 extends from body 206 and includes an aperture 218. A suspension member (not shown) may be coupled to upper arm 208 with a fastener extending through aperture 218. Similarly, lower arm 210 extends from body 206 and includes an aperture 220 extending therethrough. A suspension member (not shown) may be coupled to lower arm 210 via a fastener extending through aperture 220.

Figure 4:
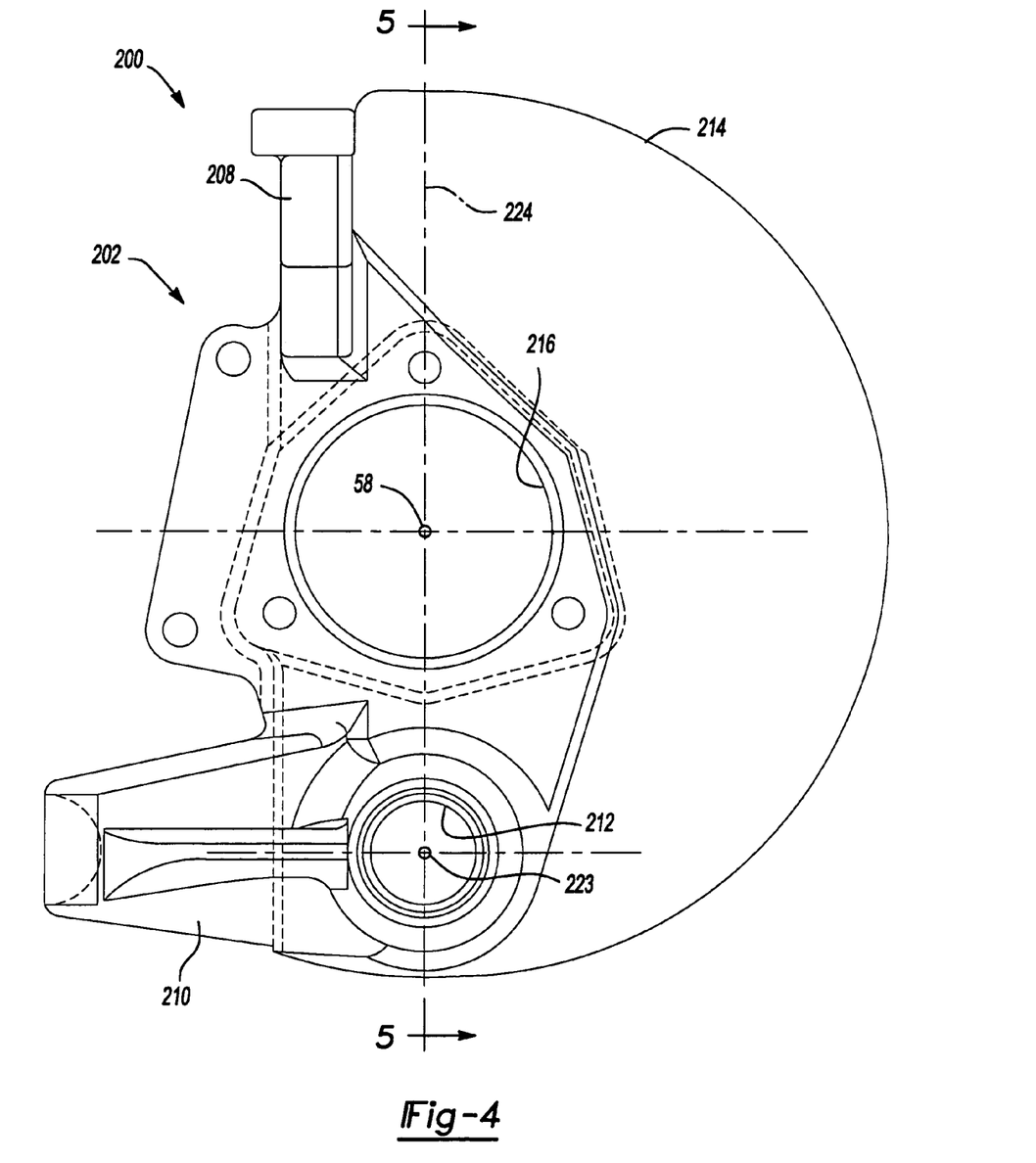
FIG. 4 is a side view depicting an alternate embodiment knuckle and ball stud assembly.
Figure 5:
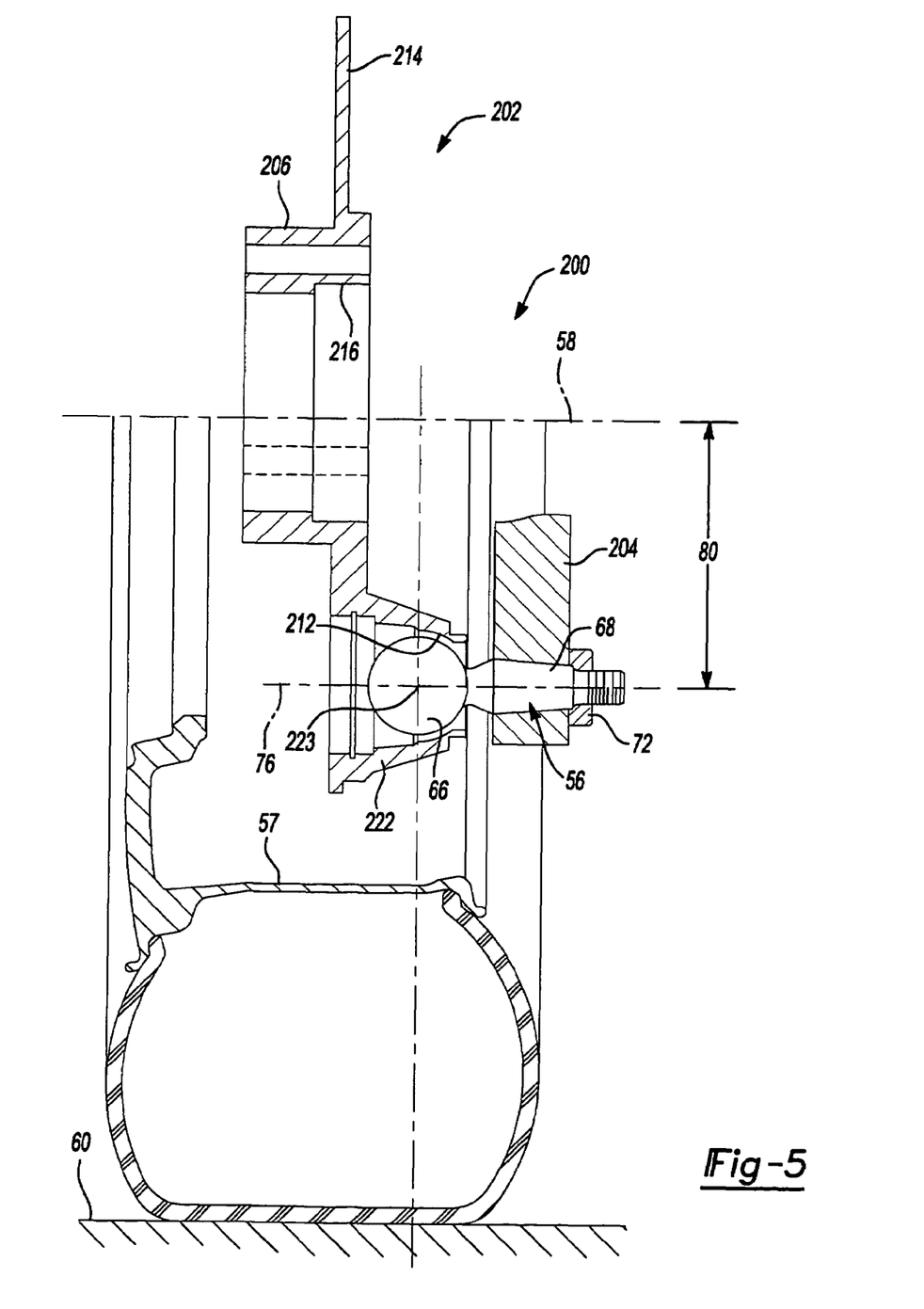
FIG. 5 is a fragmentary, cross-sectional view of an alternate embodiment wheel suspension assembly taken along line 5-5 shown in FIG. 4.
Figure 6:
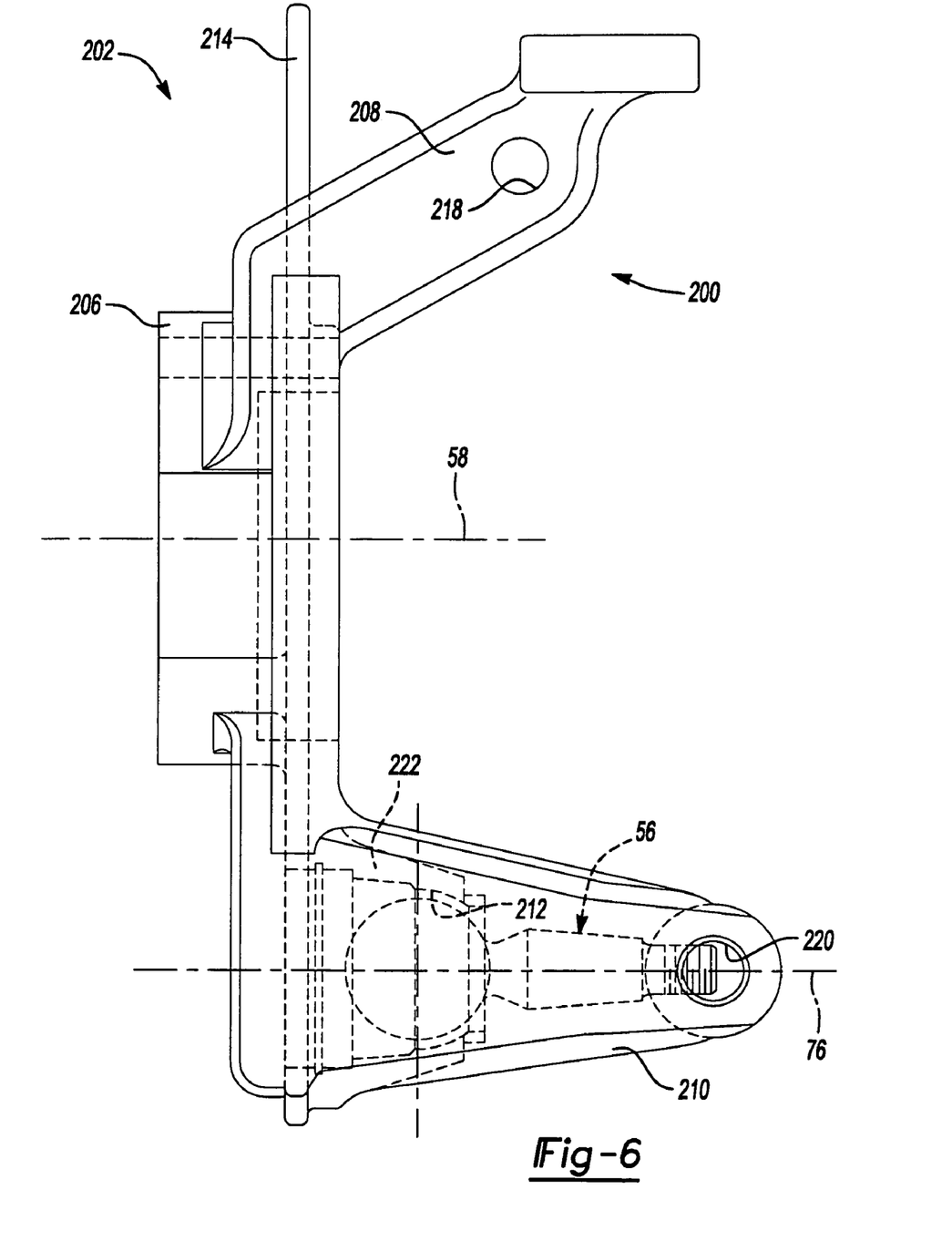
FIG. 6 is an end view of the knuckle and ball stud assembly shown in FIG. 4.
Figure 7:
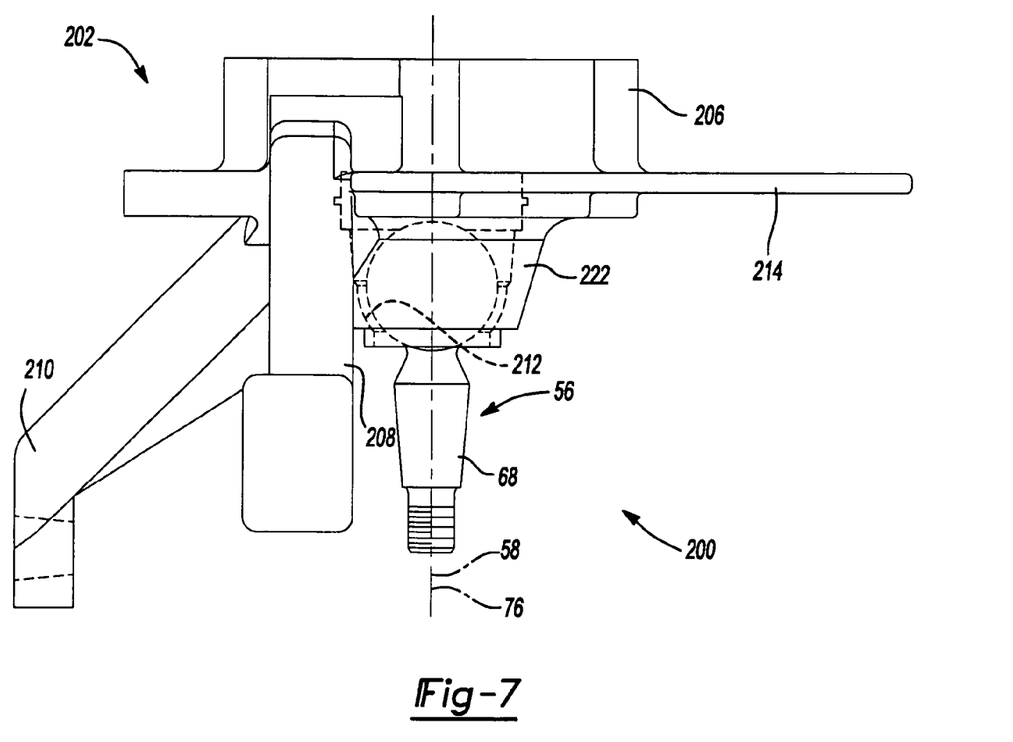
FIG. 7 is a top view of the knuckle and ball stud assembly shown in FIG. 4.

Socket 212 is formed in a boss 222. Socket 212 has a center 223 and is sized to rotatably support ball stud 56 at a location substantially aligned with the wheel rotation axis 58. More specifically, and as shown in FIG. 4, wheel rotation axis 58 and center 223 of socket 212 are aligned on a vertical centerline 224. Vertical centerline 224 perpendicularly intersects the ground 60. Dust shield 214 extends from body 206 and defines a semi-circular outer periphery. In this manner, dust shield 214 may be positioned proximate to wheel 57 without interfering with the wheel. Dust shield 214 functions to resist ingress of contamination to a brake (not shown) mounted on knuckle 202.

Figure 8:
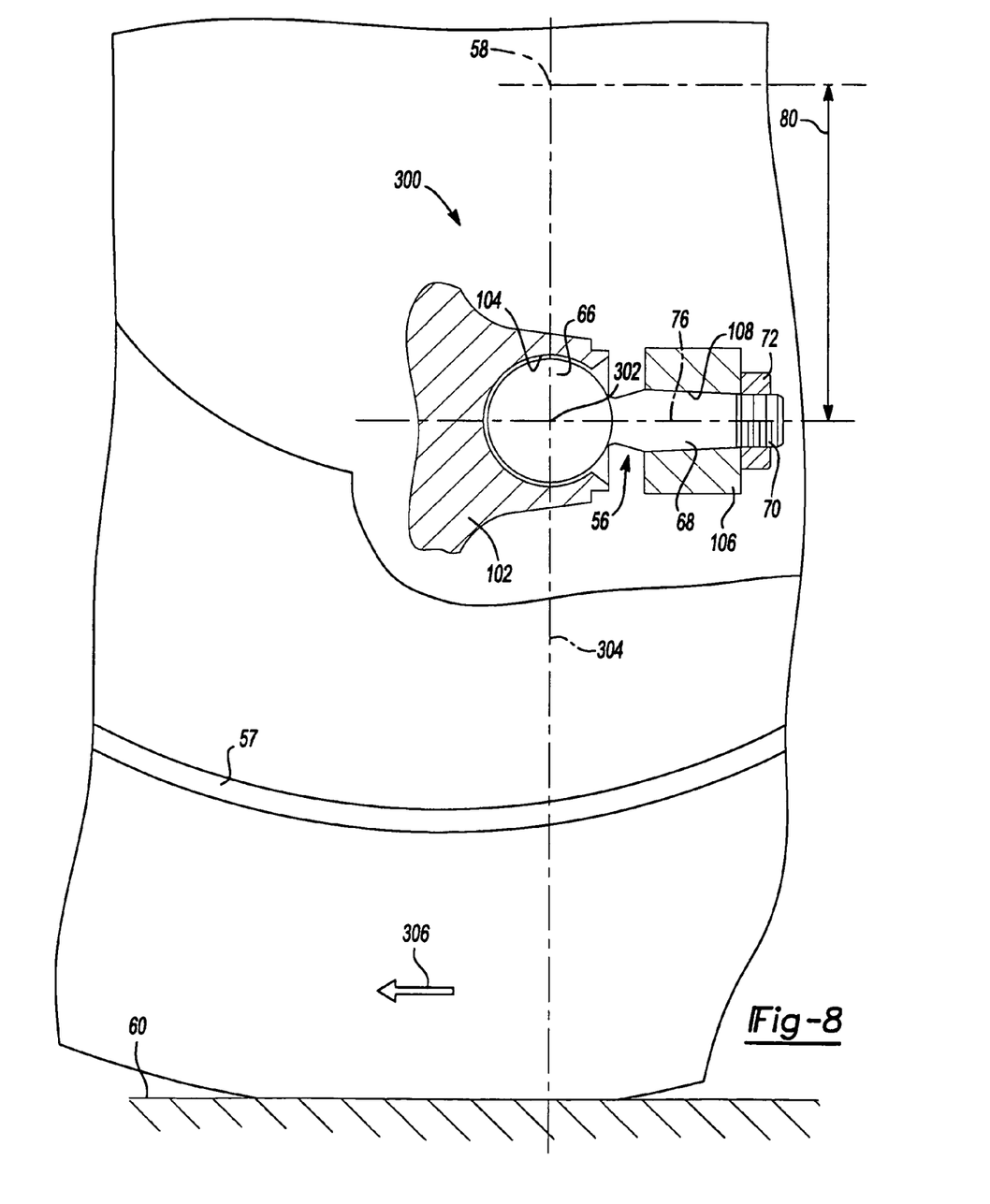
FIG. 8 is a fragmentary, cross-sectional view of an alternate embodiment wheel suspension assembly.

FIG. 8 depicts an alternate embodiment wheel suspension assembly 300. Wheel suspension assembly 300 is substantially similar to the wheel suspension assemblies previously described except that the longitudinal axis 76 of ball stud 56 extends longitudinally along the length of the vehicle instead of transversely as previously depicted in FIGS. 2-7. Because the components included within wheel suspension assembly 300 are substantially similar to the wheel suspension assemblies previously described, like elements will retain their previously introduced reference numerals.

FIG. 8 depicts ball 66 including a center 302 aligned along a vertical axis 304 passing through wheel rotation axis 58. The forward vehicle direction of travel is indicated by arrow 306. Accordingly, control arm 106 is located behind knuckle 102. It should be appreciated that longitudinal axis 76 of ball stud 56 extends substantially parallel to ground surface 60 and is positioned a known distance 80 from wheel rotation axis 58. In this manner, geometrical variations in the size of tapered shank portion 68 and/or tapered aperture 108 do not vary the distance 80.

Figure 9:
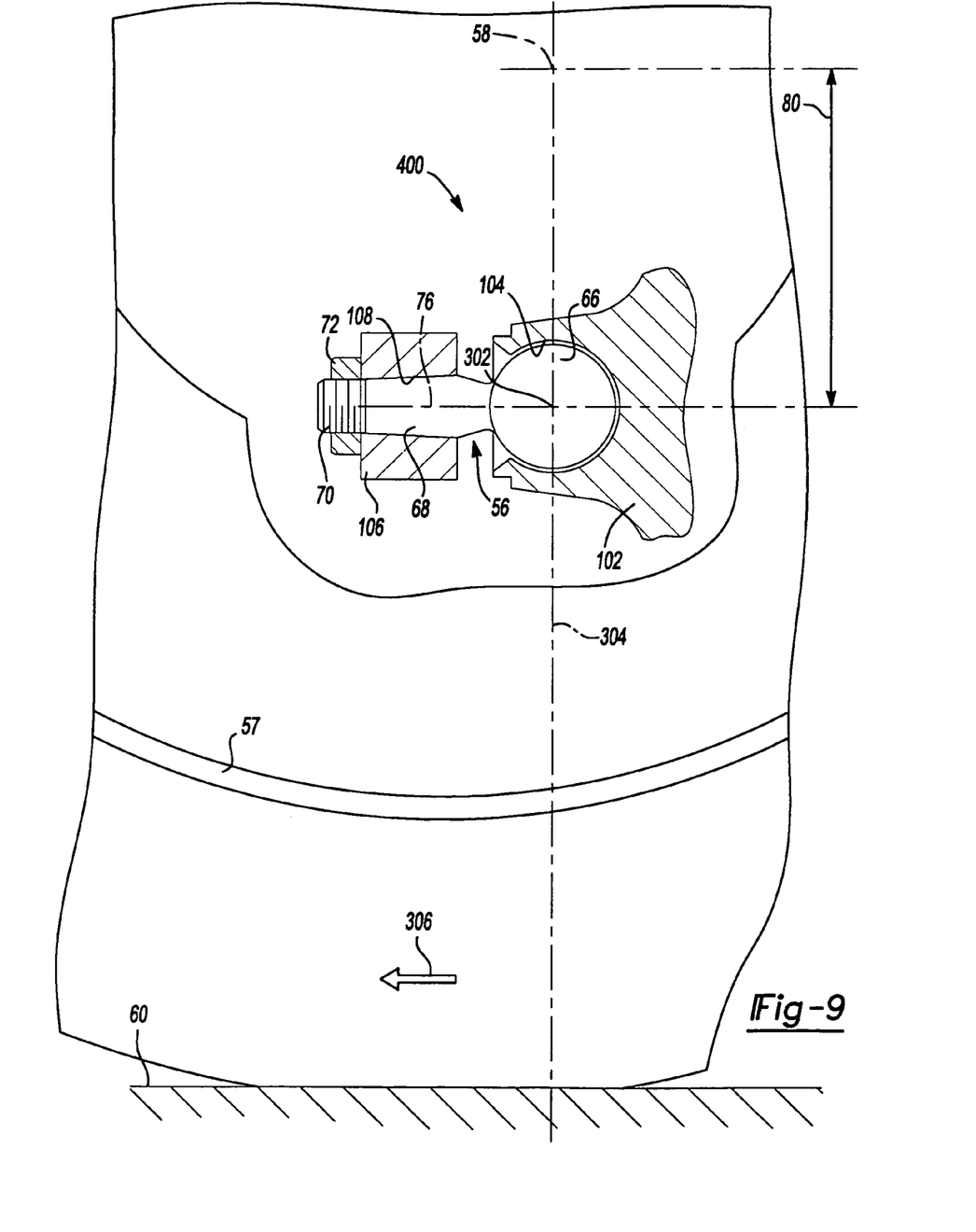
FIG. 9 is a fragmentary, cross-sectional view of an alternate embodiment wheel suspension assembly.

FIG. 9 illustrates another alternate embodiment wheel suspension assembly 400. Wheel suspension assembly 400 is substantially similar to wheel suspension assembly 300. Accordingly, like elements will retain their previously introduced reference numerals. Wheel suspension assembly 400 differs from wheel suspension assembly 300 in that control arm 106 is positioned ahead of knuckle 102 with reference to vehicle forward direction 306. Wheel suspension assembly 400 also includes longitudinal axis 76 of ball stud 56 being positioned substantially parallel to ground surface 60. Accordingly, distance 80 is maintained much more accurately than is possible with a vertically oriented stud as previously described.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A wheel suspension assembly for a vehicle operable to travel across a ground surface, the wheel suspension assembly comprising:
    a first suspension member;
    a second suspension member;
    a wheel rotatably coupled to said first suspension member; and
    a ball stud interconnecting said first and second suspension members, said ball stud having a ball and a tapered shaft, said tapered shaft extending along a longitudinal axis intersecting a center of said ball; wherein said first suspension member includes a ball socket in receipt of said ball, a center of said ball socket being aligned with a wheel axis of rotation along a vertical centerline, said second suspension member including a tapered bore in receipt of said tapered shaft, said longitudinal axis being oriented substantially parallel to the ground surface.

2. The suspension assembly of claim 1 wherein said longitudinal axis is offset from and extends substantially parallel to said axis of rotation of said wheel.

3. The suspension assembly of claim 2 wherein said longitudinal axis is positioned closer to the ground than said axis of rotation of said wheel.

4. The suspension assembly of claim 1 wherein said longitudinal axis is aligned parallel to said wheel axis of rotation.

5. The suspension assembly of claim 1 wherein said longitudinal axis and said wheel axis of rotation both lie in a plane that perpendicularly intersects the ground.

6. The suspension assembly of claim 1 wherein said longitudinal axis is adapted to extend parallel to a forward direction of vehicle travel.

7. A wheel suspension assembly for a vehicle operable to travel across a ground surface, the wheel suspension comprising:
   a knuckle having a socket;
   a control arm having a tapered aperture extending therethrough;
   a ball stud interconnecting said knuckle and said control arm, said ball stud including a substantially spherical ball portion and a tapered shank portion, said shank portion defining an axis intersecting a center of said spherical ball portion, said ball portion being rotatably captured within said socket, said ball stud being fixed to said control arm such that said tapered shank portion is positioned within said tapered aperture and said axis of said shank portion extends substantially parallel to the ground at a predetermined distance from a datum located on said knuckle.

8. The suspension assembly of claim 7 where said tapered shank engages a wall of said tapered aperture.

9. The suspension assembly of claim 8 further including a nut threadingly engaging a threaded portion of said ball stud, said nut being operable to engage said wall of said tapered aperture with said tapered shank.

10. The suspension assembly of claim 9 further including a wheel rotatably coupled to said knuckle.

11. The suspension assembly of claim 10 wherein said wheel rotates about an axis extending substantially parallel to said axis of said shank portion.

12. The suspension assembly of claim 11 wherein said shank portion axis is closer to the ground than said wheel axis.

13. The suspension assembly of claim 7 wherein a change in size of said tapered shank does not change said predetermined distance.

14. The suspension assembly of claim 7 further including a wheel rotatably coupled to said knuckle, wherein said axis of said shank portion and an axis of rotation of said wheel are positioned in a plane that perpendicularly intersects the ground.

15. The suspension assembly of claim 14 wherein said knuckle includes an upper arm adapted to be coupled to a first suspension member.

16. The suspension assembly of claim 15 wherein said knuckle includes a lower arm adapted to be coupled to a second suspension member.

17. The suspension assembly of claim 7 wherein said axis is adapted to extend parallel to a forward direction of vehicle travel.

18. A method for assembling a wheel suspension for a rotatable wheel, the wheel suspension having a first suspension member, a second suspension member and a ball stud, the ball stud having a ball portion and a tapered shank portion, the tapered shank portion defining an axis intersecting a center of the ball portion, the method comprising:
   aligning the axis of the tapered shank portion intersecting the center of the ball portion substantially parallel to the ground;
   engaging the tapered shank portion with the first suspension member;
   mounting the ball stud to the first suspension member; and
   rotatably coupling the ball portion to the second suspension member to rotatably interconnect the first and second suspension members wherein the axis of the tapered shank portion and an axis of rotation of the wheel both lie in a plane that perpendicularly intersects the ground.

19. The method of claim 18 further including extending the tapered shank portion through a tapered aperture formed in the first suspension member.

20. The method of claim 19 further including fastening the ball stud to the first suspension member with a nut.

21. The method of claim 20 further including positioning the axis of the tapered shank portion closer to the ground than said axis of rotation of the wheel.

22. A method for assembling a wheel suspension for a rotatable wheel, the wheel suspension having a first suspension member, a second suspension member and a ball stud, the ball stud having a ball portion and a tapered shank portion, the tapered shank portion defining an axis, the method comprising:
   aligning the axis of the tapered shank portion substantially parallel to the ground;
   engaging the tapered shank portion with the first suspension member;
   mounting the ball stud to the first suspension member; and
   rotatably coupling the ball portion to the second suspension member to rotatably interconnect the first and second suspension members wherein the axis of the tapered shank portion is aligned parallel to a forward direction of vehicle travel.

* * * * *